United States Patent
Calvanese Strinati et al.

(10) Patent No.: US 9,730,154 B2
(45) Date of Patent: Aug. 8, 2017

(54) METHOD FOR MANAGING AN ACCESS POINT OF A COMMUNICATION NETWORK ACCORDING TO THE TRAFFIC

(71) Applicant: Commissariat à l'Energie Atomique et aux Energies Alternatives, Paris (FR)

(72) Inventors: Emilio Calvanese Strinati, Grenoble (FR); Rohit Gupta, Grenoble (FR)

(73) Assignee: COMMISSARIAT A L'ENERGIE ATOMIQUE ET AUX ENERGIES ALTERNATIVES (FR)

( * ) Notice: Subject to any disclaimer, the term of this patent is extended or adjusted under 35 U.S.C. 154(b) by 0 days.

(21) Appl. No.: 14/424,759

(22) PCT Filed: Aug. 29, 2013

(86) PCT No.: PCT/EP2013/067924
§ 371 (c)(1),
(2) Date: Feb. 27, 2015

(87) PCT Pub. No.: WO2014/033224
PCT Pub. Date: Mar. 6, 2014

(65) Prior Publication Data
US 2015/0237575 A1    Aug. 20, 2015

(30) Foreign Application Priority Data

Aug. 30, 2012    (FR) ..................... 12 58121

(51) Int. Cl.
*H04W 52/02*    (2009.01)
*H04W 88/08*    (2009.01)

(52) U.S. Cl.
CPC ... *H04W 52/0206* (2013.01); *H04W 52/0216* (2013.01); *H04W 88/08* (2013.01)

(58) Field of Classification Search
CPC ..................... H04W 52/0206; H04W 52/0261
See application file for complete search history.

(56) References Cited

U.S. PATENT DOCUMENTS 5,727,149 A * 3/1998 Hirata ................... G06F 13/128
709/250
7,436,854 B2 * 10/2008 Miyake ................... H04L 47/14
370/469

(Continued)

OTHER PUBLICATIONS

French Search Report for Application No. FR 1258121 dated May 2, 2013.

(Continued)

*Primary Examiner* — Redentor Pasia
(74) *Attorney, Agent, or Firm* — Lerner, David, Littenberg, Krumholz & Mentlik, LLP

(57) ABSTRACT

The invention relates to a method for managing an access point of a communication network, said access point being suitable for supplying data packets to at least one communication terminal connected to said access point, said method comprising the following steps when the access point is inactive or on standby:
a plurality of data packets are placed in a queue, a data packet having a waiting time d at the expiration of which the packet is considered lost;
for each waiting time value d, the transmission time of the data packets having a waiting time d is determined; and if, for a waiting time d, a corresponding transmission time $T_d$ is higher than said corresponding waiting time d, the duration $d-T_d$ thus being negative, the method comprises a step of activating said access point in order to transmit packets from the queue, the transmitted packets preferably being those having a low waiting time.

13 Claims, 2 Drawing Sheets

(56) References Cited

U.S. PATENT DOCUMENTS

| | | | | |
|---|---|---|---|---|
| 8,199,758 B2* | 6/2012 | Patwardhan | .......... | H04L 1/1848 |
| | | | | 370/394 |
| 8,607,114 B2* | 12/2013 | Imai | .......... | H04L 1/188 |
| | | | | 370/216 |
| 8,837,366 B2* | 9/2014 | Li | .......... | H04W 24/02 |
| | | | | 370/328 |
| 2001/0002910 A1* | 6/2001 | Kikuchi | .......... | H04L 12/5692 |
| | | | | 370/468 |
| 2004/0264396 A1* | 12/2004 | Ginzburg | .......... | H04W 52/0232 |
| | | | | 370/311 |
| 2008/0192661 A1* | 8/2008 | Hamamoto | .......... | H04L 47/10 |
| | | | | 370/310 |

OTHER PUBLICATIONS

International Search Report for Application No. PCT/EP2013/067924 dated Dec. 13, 2013.

M. Tseng: "Dynamic RAN Power Management", 3rd Generation Partnership Project 2 "3GPP2", Aug. 9, 2012 (Aug. 9, 2012). XP002690588.

* cited by examiner

METHOD FOR MANAGING AN ACCESS POINT OF A COMMUNICATION NETWORK ACCORDING TO THE TRAFFIC

CROSS REFERENCE TO RELATED APPLICATION

The present application is a national phase entry under 35 U.S.C. §371 of International Application No. PCT/EP2013/067924 filed Aug. 29, 2013, published in French, which claims priority from French Patent Application No. 1258121, filed Aug. 30, 2012, the disclosures of which are incorporated by reference herein.

GENERAL TECHNICAL FIELD

The invention relates to the field of communication networks and more particularly relates to the management of an access point of a communication network.

PRIOR ART

With the emergence of smartphones and the arrival of new applications which consume data traffic, mobile telephone network operators are faced with an exponential rise in data traffic.

One solution for overcoming this problem is to make the network denser by deploying an increasing number of access points, an access point covering a geographic zone in which a communication terminal can connect to access a service.

Another solution is to increase the outputs of the access points.

One problem is that the networks deployed as well as the terminals consume more and more energy which reduces the energy efficiency of the network.

In order to increase the energy efficiency of the network, solutions are known that make it possible to activate and deactivate the access points of the network. It is specified that an access point is

- active when it is on and transmits data packets and operates at a power depending on the load of traffic to be transmitted;
- on standby when it is on and does not transmit any data packet and operates at a power $P_{standby}$;
- inactive when it is not on and operates at zero power.

One solution is, when traffic arrives at an access point, on standby or inactive and if this traffic is low, transferring this traffic to a neighbouring access point covering the communication terminal for which the traffic is intended, the initial access point then remaining inactive or on standby. The documents E. Oh and B. Krishnamachari, "*Energy savings through dynamic base station switching in cellular wireless access networks,*" in GLOBECOM 2010, 2010 IEEE Global Telecommunications Conference, December 2010, pages 1-5, M. Marsan, L. Chiaraviglio, D. Ciullo, and M. Meo, "*Optimal energy savings in cellular access networks,*" in Communications Workshops, 2009. ICC Workshops 2009. IEEE International Conference, June 2009, pages 1-5, E. Oh, B. Krishnamachari, X. Liu, and Z. Niu, "*Toward dynamic energy efficient operation of cellular network infrastructure,*" Communications Magazine, IEEE, vol. 49, no. 6, pp. 56-61, June 2011 describe such a solution.

Another solution is to render inactive an access point when it has no traffic to transmit, this solution is better known under the name discontinuous transmission (DTX). The documents L. Saker, S.-E. Elayoubi, and T. Chahed, "Minimizing energy consumption via sleep mode in green base station," in Wireless Communications and Networking Conference (WCNC), 2010 IEEE, April 2010, pages 1-6, L. Saker and S. Elayoubi, "Sleep mode implementation issues in green base stations," in Personal Indoor and Mobile Radio Communications (PIMRC), 2010 IEEE 21st International Symposium, September 2010, pages 1683-1688 and I. Godor et al., "Most promising tracks of green network technologies," EARTH D3.1, Tech. Rep., 2010 describe such a solution.

Thus, there exists a need to increase the energy efficiency of a communication network given the increase in traffic.

DESCRIPTION OF THE INVENTION

The invention meets this need and proposes for this purpose according to a first aspect a method for managing an access point of a communication network, said access point being suitable for supplying data packets to at least one communication terminal connected to said access point, the method comprising the following steps when the access point is inactive or on standby:

a plurality of data packets are placed in a queue, a data packet having a waiting time d at the expiration of which it is considered lost;

for each waiting time value d, the transmission time of the data packets having a waiting time d is determined; and if, for a waiting time d, a corresponding transmission time $T_d$ is higher than said corresponding waiting time d, the duration d−Td being negative, the method comprises a step of activating said access point in order to transmit packets from the queue, the transmitted packets being preferably those having a low waiting time.

The invention is advantageously completed by the following characteristics, taken alone or in any technically possible combinations thereof:

- the access point is suited for transmitting at least one data packet during a transmission interval, the transmission times Td corresponding to a whole number transmission interval for transmitting the packets having a waiting time d;
- at each transmission interval it is possible to transmit the data packets over several frequencies;
- the transmission time Td is a function of the duration necessary to activate the access point;
- the transmission time Td is a function of the quality of the radio link between a communication terminal and the access point.

The invention relates to, according to a second aspect, an access point of a communication network suited for supplying data packets, at least one communication terminal connected to said access point, said access point being moreover suited for implementing a method according to one of the preceding claims.

The invention relates to, according to a third aspect, a communication network comprising at least one access point according to the second aspect of the invention. Advantageously, the access point is that of a 3GPP network of the Edge, 3G, 3G+, 4G, LTE type or a non 3GPP network, of the Wi-Fi, Wimax type.

And the invention relates to, according to a fourth aspect, a computer programme product comprising code instructions for the execution of a method according to the first aspect of the invention, when said method is executed by a processor.

The invention makes it possible to improve the energy efficiency of an access point and consequently that of the network comprising several access points by exploiting the fact that data packets can wait before being conveyed to the terminals. In particular, the durations during which an access point is inactive are longer than those obtained by known type methods.

The invention applies to the access points of 3GPP networks of the Edge, 3G, 3G+, 4G, LTE type or non 3GPP networks, of the Wi-Fi, Wimax type.

DESCRIPTION OF THE FIGURES

Other characteristics, aims and advantages of the invention will become clear from the description that follows, which is purely illustrative and non-limiting, and which should be read with regard to the appended drawings in which.

DETAILED DESCRIPTION OF THE INVENTION

Figure 1:
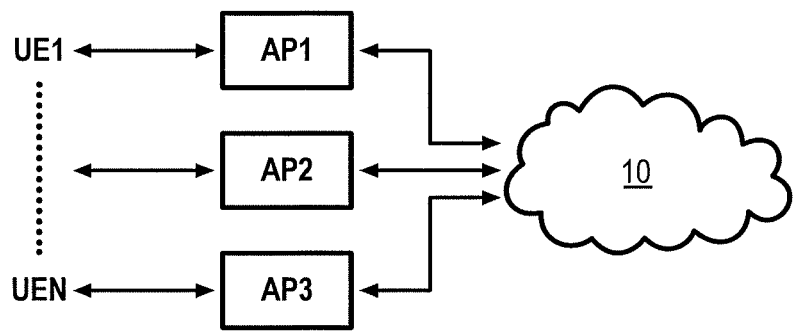
FIG. 1 illustrates a communication network according to the invention.

In relation with FIG. 1, a communication network according to the invention is illustrated.

The network comprises several access points APi making it possible to access the access networks 10 and at least one mobile terminal UE. An access network allows the mobile terminal UE to access either a telephone service or a data service (for example Internet). The access network is either 3GPP (for example, Edge, 3G, 3G+, 4G, LTE) or non 3GPP (for example Wi-Fi, Wimax).

Figure 2:
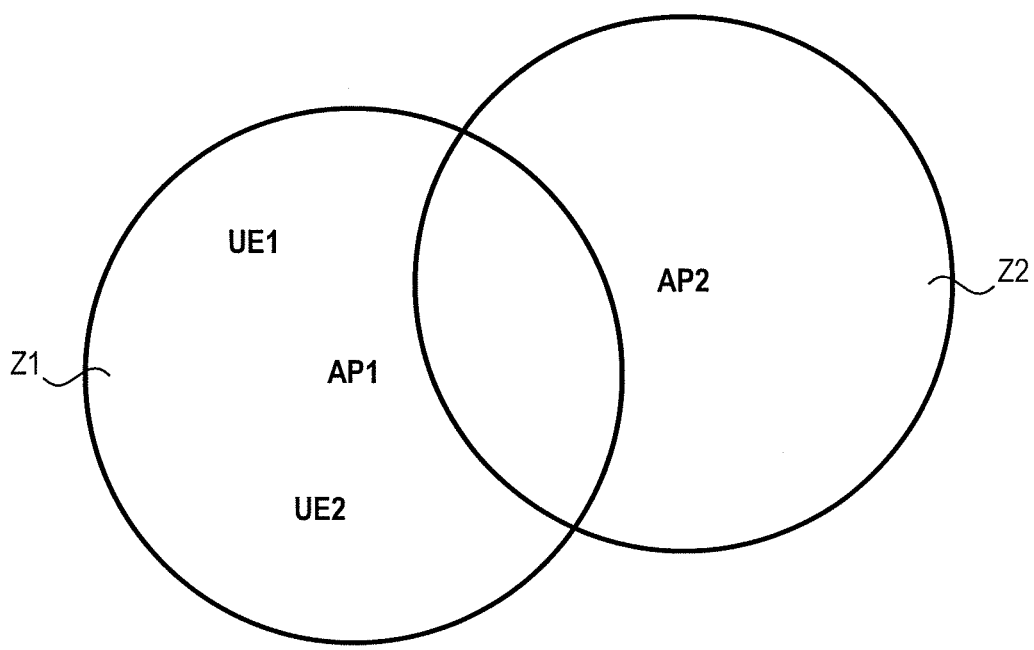
FIG. 2 illustrates a deployment of two access points in a communication network according to the invention.

In relation with FIG. 2, an access point APi (i=1, 2) defines a coverage zone Zi (i=1, 2) in which are localised two mobile terminals UE1, UE2. These access points are either 3GPP access points, or non 3GPP access points. In the case of a 4G access network, the access points are items of equipment called "eNodeB". In the case of a 3G access network, the access points are "NodeB". In the case of a 2G or GPRS access network, the access points are BTS (base transceiver stations). In the case of a WiFi access network, the access points are "hotspots". Finally, in the case of a WIMAX access network, the access points are base stations.

The access point is suited for transmitting data packets to one or more terminals.

Figure 3:
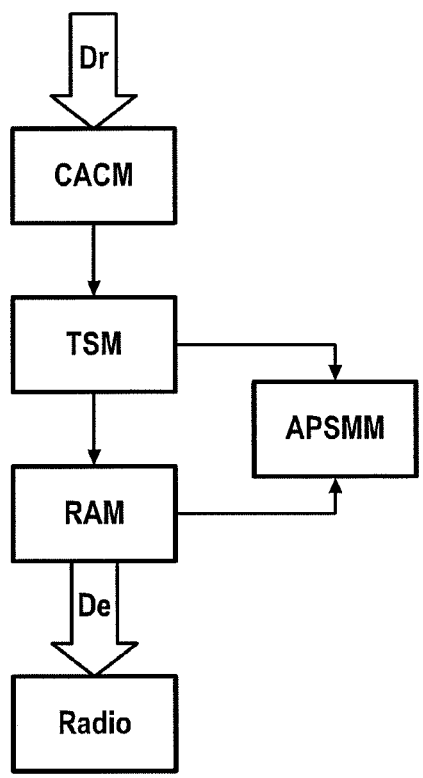
FIG. 3 illustrates the architecture of an access point according to the invention.

Reference will now be made to FIG. 3 which illustrates the architecture of an access point comprising a call admission control module (CACM), a traffic shaping module (TSM), a module for managing the activation of the access point (access point sleep mode manager (APSMM), a resource allocation module (RAM) and a radio module for transmitting the data.

The call admission control module CACM makes it possible to estimate the characteristics of the data packets Dr arriving at the access point (output, waiting time, etc.).

The traffic shaping module TSM makes it possible to place the data packets in a queue and to transmit the data packets to the resource allocation module RAM which prepares the transmission of the data packets.

The resource allocation module RAM makes it possible to prepare the transmission according to the radio link and to transmit the data packets De thereby prepared to the radio module in order that the latter transmits the data packets.

Finally the access point sleep mode manager APSMM makes it possible to manage the activation/deactivation of the access point using a management method described hereafter by triggering the preparation of data packets by the resource allocation module RAM.

Figure 4:
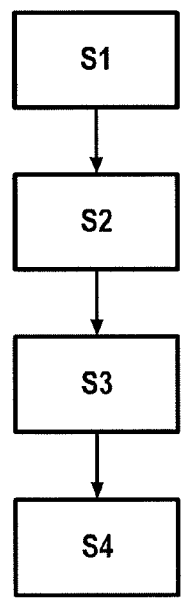
FIG. 4 illustrates steps of a method for managing an access point according to the invention.

In relation with FIG. 4, a method is described for managing an access point of a communication network according to an embodiment of the present invention.

Data packets Dr arrive at the access point intended for one or more terminals present in the coverage zone of the access point AP.

The data packets have a waiting time d at the expiration of which they are considered lost (determined by the call admission control module CACM).

It is considered that a data packet having a low waiting time d is a priority packet compared to a data packet having a longer waiting time d.

In a step S1, the data packets are placed in a queue and are preferably classified according to their level of priority, that is to say according to their waiting time d.

The data packets are intended for one or more users and it may be noted that the placing in queue and the classification are independent of the user.

The method makes it possible to manage the access point in order that the latter transmits the data packets from the moment that a packet is urgent, that is to say that it can no longer wait. The method makes it possible, apart from the urgent packet, to profit from that fact that a packet is urgent to transmit all the packets of the queue in so far as the resources are available.

In order to determine whether the access point must be activated, in a step S2, for each waiting time d value, the transmission time $T_d$ of the set of data packets having a waiting time d is determined.

Then, in a step S3, each waiting time d is compared to the corresponding transmission time $T_d$ and if, for one of the waiting times d, the corresponding transmission time $T_d$ is higher than the waiting time d, that is to say that a duration $d-T_d$ is negative, in a step S4, the access point is activated in order to transmit packets from the queue.

It will be noted that this method applies in the same manner whether the access point is, at the start of the method, on standby or inactive. In the case where the access point is inactive at the start of the method, the steps S1 to S3 may be delocalised from the access point, for example in another access point on standby or active, or be delocalised and centralised for all the access points. If the device for comparing the waiting times d with the transmission times $T_d$ is delocalised and if the access point must be activated, a signal for activating the access point may be transmitted to the access point at step S4.

Advantageously, the access point transmits during a transmission time interval (TTI), the interval during which it transmits one or more data packets. The packets may potentially be transmitted over several frequencies during a same transmission interval, a data packet occupying a frequency. It is also possible to provide for multicarrier transmission, for example of OFDMA (orthogonal frequency division multiple access) type, the carrier frequencies used being potentially grouped together in chunks, each chunk comprising a number $N_{chunks}$ of carriers less than the number of carriers available N in the communication system.

In this case, the transmission times $T_d$ correspond to a whole number transmission interval TTI to transmit the packets having a waiting time d.

Thus for example, if there is a data packet that has a waiting time d=2 ms, it is considered that the transmission time $T_{d=2}$ is equal to a transmission interval. Put another way, it is known that a transmission interval in 2 ms is needed to transmit a data packet.

Again as an example, if there are two data packets which have a waiting time d=2 ms and that it is possible to transmit during a transmission interval TTI two data packets over different frequencies, it is also considered that the transmission time $T_{d=2}$ is equal to a transmission interval.

Advantageously, the transmission time $T_d$ takes into account the duration necessary to activate the access point (from a standby or inactive mode), the retransmission times in the case of a HARQ protocol.

Also advantageously, the transmission time $T_d$ takes into account the quality of the radio link between a communication terminal and the access point.

Thus, the transmission time $T_d$ will be the maximum time between the transmission time for transmitting the data packets having a waiting time d and the transmission time corrected as a function of the characteristics of the radio link (quality of the transmission channel, type of modulation used, available power, etc.), of the duration necessary to activate the access point and of the retransmission times.

The invention is not limited to the method described above but also relates to a computer programme product comprising code instructions for the execution of the method described above, when said method is executed by a processor.

The invention claimed is:

1. A method for managing an access point of a communication network, the access point being suitable for supplying data packets to at least one communication terminal connected to the access point, the method comprising:
   placing a plurality of data packets in a queue, wherein one or more of the data packets have a waiting time, and wherein each of the data packets having a waiting time is considered lost at the expiration of the waiting time;
   determining a transmission time of each of the one or more data packets having a waiting time, wherein each of the transmission times is a function of a duration necessary to activate the access point and a duration necessary to retransmit one or more data packets from an access point to a communication terminal; and
   activating the access point in order to transmit one or more data packets in the queue if a waiting time of a data packet in the queue is higher than a transmission time of that data packet.

2. The method according to claim 1, wherein the access point is configured to transmitting at least one data packet during a transmission interval, and wherein each of the transmission times of the data packets corresponds to a whole number of transmission intervals.

3. The method according to claim 2, wherein in each transmission interval it is possible to transmit one or more data packets over several frequencies.

4. The method according to claim 1, wherein each of the transmission times is a function of a quality of the a radio link between the communication terminal and the access point.

5. An access point configured for to:
   place a plurality of data packets in a queue, wherein one or more of the data packets have a waiting time, and wherein each of the data packets having a waiting time is considered lost at the expiration of the waiting time;
   determine a transmission time of each of the one or more data packets having a waiting time, wherein each of the transmission times is a function of a duration necessary to activate the access point and a duration necessary to retransmit one or more data packets from the access point to a communication terminal; and
   activate in order to transmit one or more data packets in the queue if a waiting time of a data packet in the queue is higher than a transmission time of that data packet.

6. A communication network comprising at least one access point according to claim 5 and at least one communication terminal.

7. The communication network according to the claim 6, wherein the access point is part of a 3GPP network, such as Edge, 3G, 3G+, 4G, or LTE.

8. The communication network according to the claim 6, wherein the access point is part of a non 3GPP network, such as Wi-Fi or Wimax.

9. The access point according to claim 5, wherein each of the transmission times is a function of a quality of a radio link between the communication terminal and the access point.

10. The access point according to claim 9, wherein the access point is configured to transmit at least one data packet during a transmission interval, and wherein each of the transmission times of the data packets corresponds to a whole number of transmission intervals.

11. A non-transitory recording medium comprising instructions that, when executed by one or more processors, cause the one or more processors to:
    place a plurality of data packets in a queue, wherein one or more of the data packets have a waiting time, and wherein each of the data packets having a waiting time is considered lost at the expiration of the waiting time;
    determine a transmission time of each of the one or more data packets having a waiting time, wherein each of the transmission times is a function of a duration necessary to activate the access point and a duration necessary to retransmit one or more data packets from an access point to a communication terminal; and
    activate the access point in order to transmit one or more data packets in the queue if a waiting time of a data packet in the queue is higher than a transmission time of that data packet.

12. The non-transitory recording medium according to claim 11, wherein each of the transmission times is a function of a quality of a radio link between the communication terminal and the access point.

13. The non-transitory recording medium according to claim 12, wherein the access point is configured to transmit at least one data packet during a transmission interval, and wherein each of the transmission times of the data packets corresponds to a whole number of transmission intervals.

* * * * *

UNITED STATES PATENT AND TRADEMARK OFFICE
CERTIFICATE OF CORRECTION

PATENT NO. : 9,730,154 B2  
APPLICATION NO. : 14/424759  
DATED : August 8, 2017  
INVENTOR(S) : Emilio Calvanese Strinati et al.

It is certified that error appears in the above-identified patent and that said Letters Patent is hereby corrected as shown below:

In the Claims

Column 5, Line 49, "configured to transmitting" should read --configured to transmit--.
Column 6, Line 1, "configured for to:" should read --configured to:--.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*